United States Patent [19]

Stiefel et al.

[11] 4,282,062

[45] Aug. 4, 1981

[54] PROCEDURE AND EQUIPMENT FOR INJECTING GAS INTO LIQUIDS

[75] Inventors: Max Stiefel, Mannheim; Erich Wolfbeiss, Ettlingen, both of Fed. Rep. of Germany

[73] Assignee: Babcock-Brown Boveri Reaktor GmbH, Mannheim, Fed. Rep. of Germany

[21] Appl. No.: 948,120

[22] Filed: Oct. 2, 1978

[51] Int. Cl.³ .............................................. G21D 1/02
[52] U.S. Cl. ......................................... 176/37; 176/38
[58] Field of Search ...................... 176/38, 92 R, 19 R, 176/37, 86 G; 261/87, 34 R, 36 R

[56] References Cited

U.S. PATENT DOCUMENTS

| | | | |
|---|---|---|---|
| 2,372,538 | 3/1945 | White | 415/116 |
| 2,791,182 | 5/1957 | Scheidl | 415/116 |
| 2,937,981 | 5/1960 | Allen | 176/38 |
| 3,482,520 | 12/1969 | Larsen | 415/116 |
| 3,663,117 | 5/1972 | Warren | 415/116 |
| 3,663,725 | 5/1972 | Pearl | 176/92 R |
| 3,806,408 | 4/1974 | Grant | 176/19 R |
| 3,976,541 | 8/1976 | Stiteler | 176/92 R |
| 4,018,859 | 4/1977 | Müller | 261/87 |
| 4,024,911 | 5/1977 | Forrest | 176/37 |
| 4,043,864 | 8/1977 | Heitmann | 176/37 |

FOREIGN PATENT DOCUMENTS 1042779 11/1958 Fed. Rep. of Germany ............ 176/38

*Primary Examiner*—Samuel W. Engle
*Assistant Examiner*—Edward F. Miles
*Attorney, Agent, or Firm*—D. Anthony Gregory; Robert J. Edwards

[57] ABSTRACT

A gas charging device injects hydrogen into the pressurized water that cools the core of a nuclear power reactor through nozzles provided in a pressurized water flow pump. Conduit and valve combinations also are provided to permit solid matter to be flushed from the nozzles.

6 Claims, 2 Drawing Figures

PROCEDURE AND EQUIPMENT FOR INJECTING GAS INTO LIQUIDS

TECHNICAL FIELD

The invention relates to a procedure for injecting gas into liquids and, more particularly, to injecting hydrogen gas into the primary coolant for pressurized water nuclear power plants, and the like.

BACKGROUND ART

It is not uncommon in nuclear power plants, to inject hydrogen gas into water by spraying primary coolant (i.e. water) into an atmosphere that contains hydrogen, e.g., into the hydrogen gas blanket of the makeup tank, or by bubbling hydrogen gas in the water phase of the makeup take. The makeup tank, moreover, is used, among other things, to equalize primary coolant volume changes. Toward this end, the makeup tank contains primary coolant and a hydrogen-gas blanket.

These procedures have the disadvantage that due to the large hydrogen volume in the makeup tank, a release of relatively large hydrogen volumes into the space surrounding the makeup tanks cannot be precluded, and therefore the possibility of gas explosions must be considered. There is a further disadvantage in the fact that the liquid gas content cannot be precisely controlled.

There is a need, therefore, to find a procedure through which a preset gas content can be reached in the liquid that is to be gassed and in which a release of dangerous volumes of gas can be reliably avoided.

SUMMARY OF THE INVENTION

In accordance with the invention these disadvantages are solved in that a specific gas volume is channeled to a pump. The pump is in fluid communication with the liquid flow that is to be injected with gas, and the gas is mixed with the liquid inside the pump casing.

For multi-stage centrifugal pumps, the gas preferably is injected near the last stage, because optimum mixing occurs there.

The equipment for implementing this procedure includes a gas charging device that is installed in the gas injection conduit. The gas injection conduit is designed doubly redundant on the discharge side of the gas charging pump and the conduits are directly or indirectly connected with gas injection nozzles inside the pump casing. Hereinafter the term nozzles refers to gas injection nozzles only.

Preferably the nozzles are arranged on the inner wall of the casing, on the pump rotor, in the pump suction conduit or in some combination of these locations. The nozzles can be flushed through a bypass flow of the gas-injected liquid. The conduits of the bypass flow are connected to the gas injection conduits. Furthermore, the gas injection conduit conduit isolation valves and bypass flow conduits can be shut off to enable the nozzles alternately injest gas and be flushed with rinse water.

Upstream and downstream from the pump an analysis measuring device is coupled to the liquid flow in question.

The gas volume that is to be injected by way of this gas charging equipment depends upon the hydrogen content that is present in the liquid which is to be injected and the head of the liquid flow.

The procedure and the equipment for implementing this invention are explained in more complete detail by means of a schematic drawing.

BRIEF DESCRIPTION OF THE DRAWING

Illust. 1 is a schematic representation of an embodiment of the invention; and

Illust. 2 is a section through a flow pump.

DESCRIPTION OF THE PREFERRED EMBODIMENTS

Figure 1:
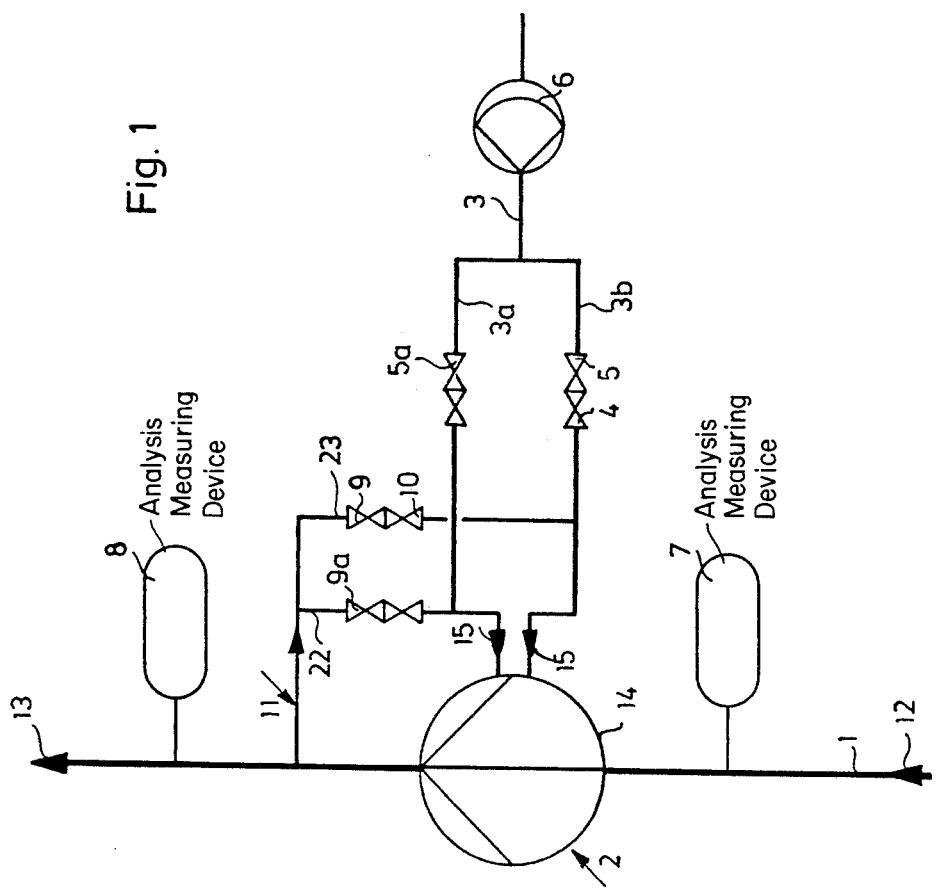

The primary coolant of a pressurized water reactor system (not shown) which is to be injected with gas, flows in conduit 1 in the direction of the arrow 12. This primary coolant is further channeled in the direction of arrow 13 through a flow pump 2 that is installed in the conduit for normal use in a nuclear reactor system. With the aid of a gas charging device, illustratively, gas pump 6, a certain gas volume of which hydrogen is typical, is injected into pump casing 14 in the direction of arrows 15, through a gas feed conduit 3 and then by way of two gas injection conduits 3a, 3b. Analysis measuring devices 7 and 8 coupled to the conduit 1 upstream and downstream, respectively, of the flow pump 2, provide information concerning the hydrogen concentration, or content, of the primary coolant prior to and after the injection of gas. Control of the gas volume, which must be injected via gas pump 6, is a function of the hydrogen content measured in the primary coolant downstream of the point at which gas is injected into the volume of liquid flowing in the conduit 1.

Figure 2:
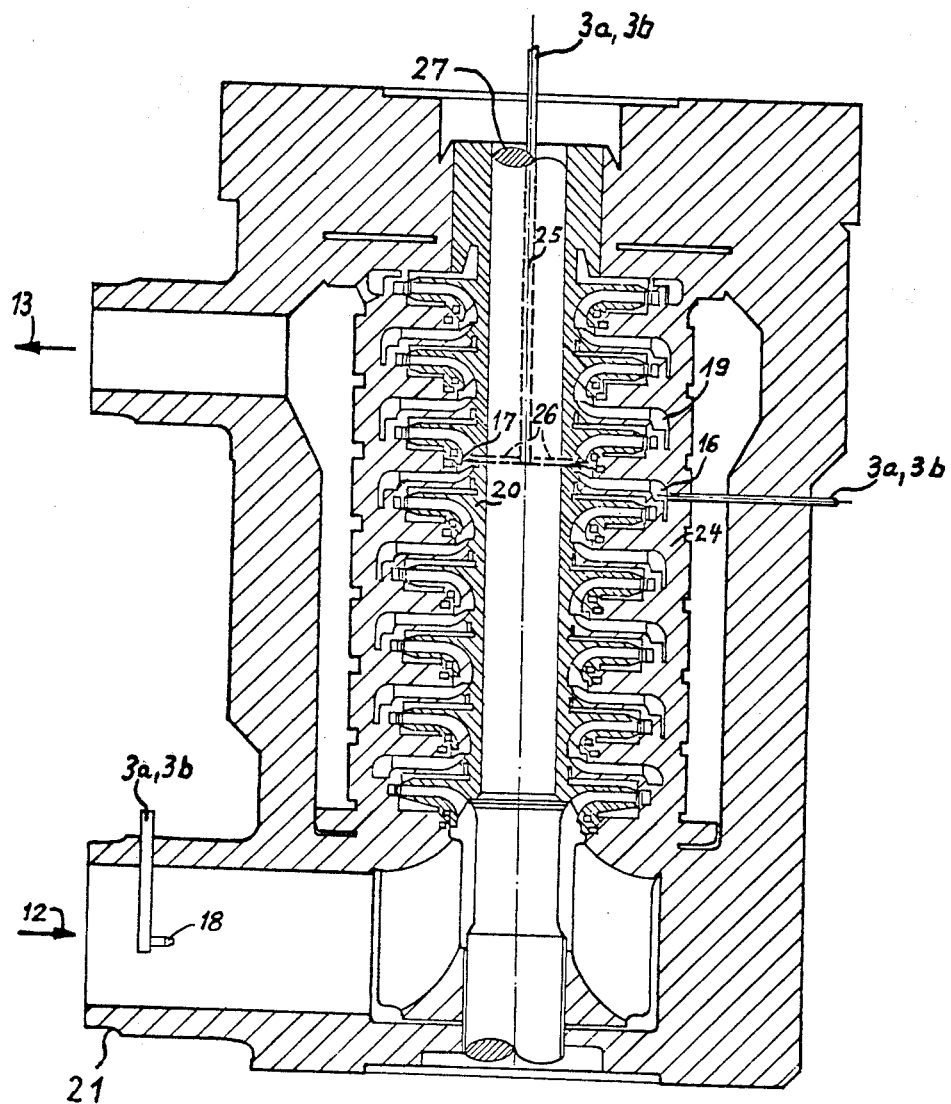

As shown in FIG. 2, the gas injection takes place on the inside of the pump casing, via nozzles 16, 17, 18 which are arranged on the casing inside wall 19, the pump rotor 20 or in suction conduit 21. Because the design shown in illustration 2 represents a multi-stage flow pump, nozzles 16 are arranged on the inside wall 19 of multi-stage casing 24. The nozzles are respectively in communication with the gas injection conduit 3a or 3b. When injecting gas with the aid of pump rotor 20, the bores 25, 26 in pump shaft 27 and pump rotor 20 form an elongation or extension of the gas injection line 3a, 3b.

Flushing of the nozzles is required during injections of dry gases into salt solutions (primary coolant is a salt solution) because there is a danger that one or more of the nozzles will close as a result of local solubility excess. For this reason, a bypass flow conduit 11 (FIG. 1) branches from the discharge side of the flow pump 2 into conduits 22 and 23 which are coupled, respectively to gas injection conduits 3a, and 3b. If isolation valves 9a and 5 are now closed, and isolation valves 9 and 5a open, a gas flow runs through gas injection conduit 3a, to the nozzles connected with this conduit and the liquid rinse runs through gas injection conduit 3b to the nozzles connected with this conduit. Through a reverse manipulation of the valves, the nozzles connected to gas injection conduit 3a will be flushed, and the injection of gas will take place via the nozzles connected to gas injection conduit 3b. Check valves 4, 10 prevent a backflow of gas or liquid rinse. This process takes place automatically, so that as the nozzles associated with conduit 3a are being rinsed, the nozzles associated with conduit 3b are utilized for injecting gas and vice versa.

The injection of gas is possible according to this procedure and the associated equipment, in a simplified and advantageous manner. Nitrogen, moreover, can be used as a gas blanket for the makeup tank, so that the danger of a combustion gas explosion is precluded.

An additional advantage of the technique under consideration is the fact that the hydrogen content of the reinjected primary coolant can also be kept within the specified values during load change processes.

We claim:

1. A device for injecting gas into the reactor coolant for pressurized water nuclear power plants comprising:
   a gas pump;
   a reactor coolant conduit;
   a feed pump having a housing;
   a first plurality of gas injection nozzles positioned within said housing;
   a second plurality of gas injection nozzles positioned within said housing;
   a first gas injection conduit establishing fluid communication between the outlet of said gas pump and said first plurality of gas injection nozzles;
   a second gas injection conduit establishing fluid communication between the outlet of said gas pump and said second plurality of gas injection nozzles;
   a first bypass flow conduit establishing fluid communication between said reactor coolant conduit downstream from said pump and said first gas injection conduit;
   a second bypass flow conduit establishing fluid communication between said reactor coolant conduit downstream from said feed pump and said second gas injection conduit;
   a first gas injection conduit isolation valve for selectively opening and closing said first gas injection conduit between said gas pump and said first bypass flow conduit;
   a second gas injection conduit isolation valve for selectively opening and closing said second gas injection conduit between said gas pump and said second bypass flow conduit;
   a first gas injection conduit check valve positioned between said gas pump and said first bypass flow conduit for precluding fluid flow in the direction of said gas pump within said first gas injection conduit;
   a second gas injection conduit check valve positioned between said gas pump and said second bypass flow conduit for precluding fluid flow in the direction of said gas pump within said second gas injection conduit;
   a first bypass flow conduit isolation valve for selectively opening and closing said first bypass flow conduit between said reactor coolant conduit and said first gas injection conduit;
   a second bypass flow conduit isolation valve for selectively opening and closing said second bypass flow conduit between said reactor coolant conduit and said second gas injection conduit;
   a first bypass flow conduit check valve positioned between said reactor coolant conduit and said first gas injection conduit for precluding fluid flow in the direction of said reactor coolant conduit within said first bypass flow conduit;
   a second bypass flow conduit check valve positioned between said reactor coolant conduit and said second gas injection conduit for precluding fluid flow in the direction of said reactor coolant conduit within said second bypass flow conduit;
   and, analysing means for determining the gas content of the reactor coolant at both the inlet and outlet of said feed pump.

2. A device for injecting gas into a reactor coolant for pressurized water nuclear power plants comprising: a gas pump; a feed pump having a housing; nozzles within the housing for injecting gas into the coolant; a gas feed conduit in communication with said gas pump in which the gas feed conduit divides into two gas injection conduits on an outlet side of the gas pump to establish fluid communication with at least one of the nozzles in the interior of the feed pump housing through at least one of the two gas injection conduits; two by pass flow conduits, each establishing communication between the feed pump and a corresponding one of said two gas injection conduits; and, valve means to selectively regulate gas flow through said by-pass conduits and said gas injection conduits in order to alterately supply gas and flushing water to the nozzles.

3. A device according to claim 2 wherein the nozzles are arranged in an inner wall of the housing.

4. A device according to claim 2 wherein the feed pump has a pump shaft and a pump impeller, the shaft having bores formed therein to establish fluid communication with the nozzles, the nozzles being located at the pump impeller.

5. A device according to claim 2 wherein the feed pump further comprises a suction conduit and the nozzles being located within the suction conduit.

6. A device according to claim 2 further comprising gas content measuring apparatus arranged in fluid communication with the flow of liquid to and from the feed pump.

* * * * *

UNITED STATES PATENT AND TRADEMARK OFFICE
CERTIFICATE OF CORRECTION

PATENT NO. : 4,282,062

DATED : August 4, 1981

INVENTOR(S) : Max Stiefel and Erich Wolfbeiss

It is certified that error appears in the above—identified patent and that said Letters Patent is hereby corrected as shown below:

Column 1, line 17, "take" should read -- tank --
Column 1, line 60, "injest" should read -- inject --.

Signed and Sealed this

Thirty-first Day of August 1982

[SEAL]

Attest:

GERALD J. MOSSINGHOFF

Attesting Officer — Commissioner of Patents and Trademarks

UNITED STATES PATENT AND TRADEMARK OFFICE
CERTIFICATE OF CORRECTION

PATENT NO. : 4,282,062

DATED : August 4, 1981

INVENTOR(S) : Max Stiefel et al.

It is certified that error appears in the above—identified patent and that said Letters Patent is hereby corrected as shown below:

On the title page add:

[30] Foreign Application Priority Data

-- Oct. 27, 1977   [DE] Fed. Rep. of Germany   2748160 --

Column 1, line 17, "take" should read -- tank --.

Column 1, line 60, "injest" should read -- inject --.

This certificate supersedes Certificate of Correction issued Aug. 31, 1982.

Signed and Sealed this

Twenty-second Day of February 1983

[SEAL]

Attest:

Attesting Officer

GERALD J. MOSSINGHOFF

Commissioner of Patents and Trademarks